United States Patent
Lai et al.

(10) Patent No.: US 7,096,005 B2
(45) Date of Patent: Aug. 22, 2006

(54) METHOD OF CARRYING OUT A SAFE REMOTE ELECTRONIC SIGNING BY CELLULAR PHONE

(75) Inventors: Shing Cheng Lai, Taipei Hsien (TW); Sheng Gui Zhao, Nanking (CN); Long Xiao Fan, Nanking (CN)

(73) Assignee: Inventec Appliances Corp., Taipei Hsien (TW)

( * ) Notice: Subject to any disclaimer, the term of this patent is extended or adjusted under 35 U.S.C. 154(b) by 618 days.

(21) Appl. No.: 10/348,776

(22) Filed: Jan. 23, 2003

(65) Prior Publication Data

US 2004/0176070 A1   Sep. 9, 2004

(51) Int. Cl.
 H04M 1/66 (2006.01)
 H04M 1/68 (2006.01)
 H04M 3/16 (2006.01)
(52) U.S. Cl. ............ 455/411; 705/26; 705/44; 380/247; 380/270; 380/279; 713/153; 713/155; 713/176
(58) Field of Classification Search ........ 455/410–411, 455/414.1, 418–419, 425; 705/65, 1, 26, 705/42, 44; 379/91.01, 93.02, 93.03, 93.24, 379/100.06, 100.08, 100.09, 100.14, 102.01; 380/247, 270, 277, 279, 283; 713/153, 155–156, 713/161, 168, 170–173, 175–176, 184
See application file for complete search history.

(56) References Cited

U.S. PATENT DOCUMENTS

| | | | |
|---|---|---|---|
| 6,016,476 A * | 1/2000 | Maes et al. ................... 705/1 |
| 6,904,416 B1 * | 6/2005 | Nassiri ........................ 705/51 |
| 6,990,585 B1 * | 1/2006 | Maruyama et al. ......... 713/176 |
| 2001/0042050 A1 * | 11/2001 | Fletcher et al. .............. 705/64 |
| 2002/0078159 A1 * | 6/2002 | Petrogiannis et al. ....... 709/206 |
| 2002/0143704 A1 * | 10/2002 | Nassiri ........................ 705/51 |
| 2002/0143711 A1 * | 10/2002 | Nassiri ........................ 705/76 |
| 2002/0178122 A1 * | 11/2002 | Maes ........................... 705/64 |
| 2003/0033528 A1 * | 2/2003 | Ozog et al. ................ 713/170 |
| 2003/0131244 A1 * | 7/2003 | Buoncristiani et al. ..... 713/176 |
| 2004/0255034 A1 * | 12/2004 | Choi ........................... 709/229 |
| 2005/0010758 A1 * | 1/2005 | Landrock et al. ........... 713/156 |
| 2005/0132201 A1 * | 6/2005 | Pitman et al. .............. 713/176 |

* cited by examiner

*Primary Examiner*—Binh K. Tieu
(74) *Attorney, Agent, or Firm*—Bacon & Thomas, PLLC

(57) ABSTRACT

The invention relates to a method of carrying out a safe remote electronic signing by a cellular phone coupled to a computer having a browser for setting conditions for accessing the Internet, the computer being operated to perform the steps of registering for obtaining an authorized browsing driver from a server based on the conditions; installing the browsing driver in the cellular phone; and when the cellular phone is activated to access the Internet for remote signing of an electronic document, selecting a safety level by running the browsing driver, in response to the selected safety level, adding a corresponding password in the document, and sending the document over the Internet in a form of encryption for transmission on an authorized network channel.

6 Claims, 3 Drawing Sheets

METHOD OF CARRYING OUT A SAFE REMOTE ELECTRONIC SIGNING BY CELLULAR PHONE

FIELD OF THE INVENTION

The present invention relates to remote electronic signing and more particularly to a method of carrying out a safe remote electronic signing by a cellular phone.

BACKGROUND OF THE INVENTION

Both Information and electronics technologies have known a rapid, spectacular development. Further, over the past decade there has been a simultaneous growth in computer, mobile communication, and network leading to an increasing use of related products. Recently, there is a trend of developing compact, multifunctional, and inexpensive communication products. A number of products such as cellular phones and Personal Digital Assistants (PDAs) closely related to our daily life are very popular among consumers. The increasing popularity of such portable communication devices not only shortens distance between people but also reduces time required for achieving the communication. Moreover, features and quality required by consumers are diversified and high as a variety of communication products have been commercially available. As such, a leading indicator regarding the manufacturing technology of communication product can be decided by determining whether it can provide more convenient, more effective, and multi-functional services to users.

Quite often, more and more newer models of cellular phone have the capability of sending, receiving e-mails and accessing a network (e.g., the Internet) in real time. As such, a user can retrieve latest information by using the cellular phone at any time and place without being adversely affected by geography. However, the well-known cellular phone does not provide any safety action. As such, a third party may illegally intercept credentials being sent or received by a cellular phone or an electronic list being signed online. This can cause significant loss to the user. Therefore, it is desirable for communication product manufacturers to provide means for enabling a cellular phone user to sign an electronic list online at any time and place and safely sending the electronic list over the Internet without being affected by geography, buildings, and locations.

SUMMARY OF THE INVENTION

A primary object of the present invention is to provide a method of carrying out a safe remote electronic signing by a cellular phone for overcoming the above drawback of the prior art. For example, a third party may illegally intercept credentials being sent or received by a cellular phone or an electronic list being signed online, resulting in a significant loss to the user.

Another object of the present invention is to provide a method of carrying out a safe remote electronic signing by a cellular phone coupled to a computer having a browser for setting conditions for accessing the Internet, a central processing unit (CPU) of the computer being operated to perform the steps of registering for obtaining authorization including an authorized browsing driver from a server based on the conditions; installing the authorized browsing driver in the cellular phone; and when the cellular phone is activated to access the Internet for remote signing of an electronic document, selecting a safety level by running the browsing driver, in response to the selected safety level, adding a corresponding password in the electronic document, and sending the electronic document over the Internet in a form of encryption for transmission on an authorized network channel.

Still another object of the present invention is to provide a method of carrying out a safe remote electronic signing by a cellular phone having a Web browsing driver of a computer installed therein, the cellular phone being activated to access the Internet for remote signing of an electronic document, setting conditions for accessing the Internet in the Web browsing driver, and operating a microprocessor of the cellular phone to perform the steps of registering for obtaining authorization from a server based on the conditions; selecting a safety level by running the browsing driver; and in response to the selected safety level, adding a corresponding password in the electronic document; and sending the electronic document over the Internet in a form of encryption for transmission on an authorized network channel.

The above and other objects, features and advantages of the present invention will become apparent from the following detailed description taken with the accompanying drawings.

DETAILED DESCRIPTION OF THE PREFERRED EMBODIMENTS

Figure 1:
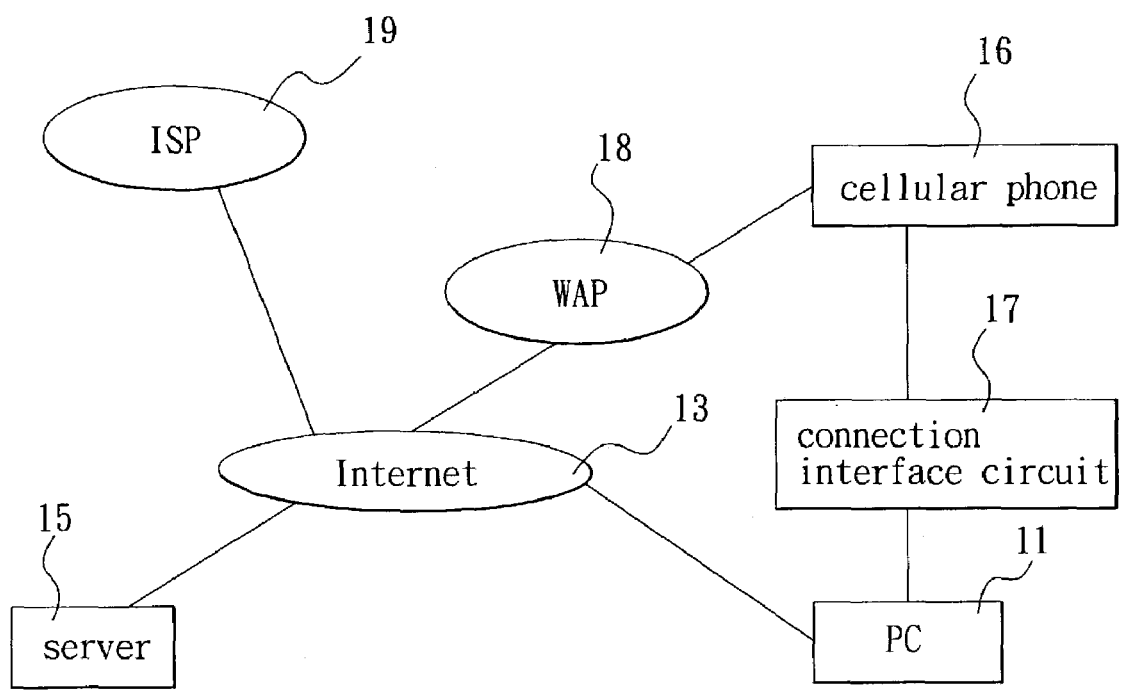
FIG. 1 is a schematic drawing illustrating a structure applicable to a first preferred embodiment of the invention.

Referring to FIG. 1, there is shown a structure applicable to a first preferred embodiment of the invention for a method of carrying out a safe remote electronic signing by cellular phone. A browser (e.g., Internet Explorer) in a personal computer 11 is used to set conditions for accessing the Internet 13. A central processing unit (CPU) of the computer 11 may be operated to register for obtaining authorization from a server 15 based on the conditions. An obtained authorized browsing driver is then installed in a cellular phone 16. As such, a user may operate the cellular phone 16 to access the Internet 13 for remote signing of an electronic document. Further, a safety level can be selected by running the driver. In response to the selected safety level, a corresponding password is added in the electronic document. Hence, the electronic document can be sent over the Internet 13 in encrypted form for transmission on an authorized network channel.

Referring to FIG. 1 again, it is particularly noted that the cellular phone 16 is coupled to the computer 11 through a connection interface circuit 17. The computer 11 is able to install the obtained authorized browsing driver in the cellular phone 16. Also, the cellular phone 16 is coupled to the Internet 13 through a wireless application protocol (WAP) 18 for sending data over the Internet 13. Moreover, the user can use the cellular phone 16 to connect to an Internet service provider (ISP) 19 for establishing a set of rules about messages. Once established, the server 15 may receive electronic documents from the Internet 13 based on the set of rules. Once an electronic document is received, signals associated therewith are transmitted to the ISP 19. In response, the ISP 19 sends a message to the cellular phone 16 for informing the user of the electronic document to be signed.

Figure 2:
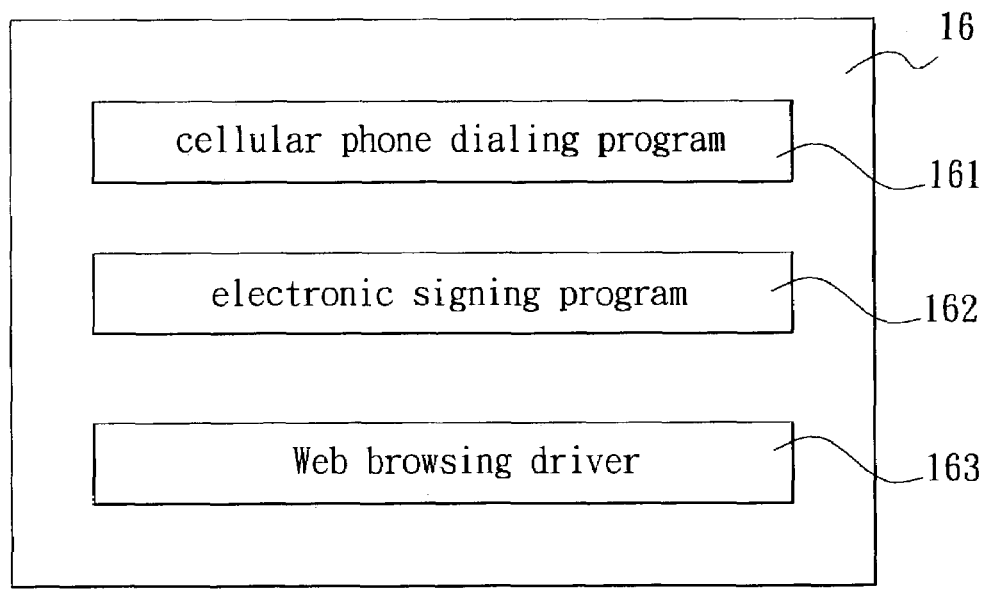
FIG. 2 is a schematic drawing illustrating software elements of cellular phone according to the invention.

Referring to FIGS. 1 and 2, in the embodiment the cellular phone 16 comprises a cellular phone dialing program 161, an electronic signing program 162, and a Web browsing driver 163. The cellular phone dialing program 161 can be run to dial the cellular phone 16 for accessing the Internet 13. Once a connection to the Internet 13 is established, the cellular phone 16 is able to sign the electronic document online by running the electronic signing program 162. The Web browsing driver 163 is obtained as the computer 11 installs the obtained authorized browsing driver in the cellular phone 16. The user can select a desired safety level by running the driver for establishing a customized virtual dedicated network. As stated above, the corresponding password is added in the electronic document by the cellular phone 16 prior to sending over the Internet 13. Further, the encrypted electronic document is sent safely thereover. Even if a third party (e.g., cellular phone user) illegally intercepts the electronic document sent over the Internet 13, there is no way for the unauthorized third party to browse content of the electronic document. As a result, the purpose of protecting electronic documents is achieved.

Figure 3:
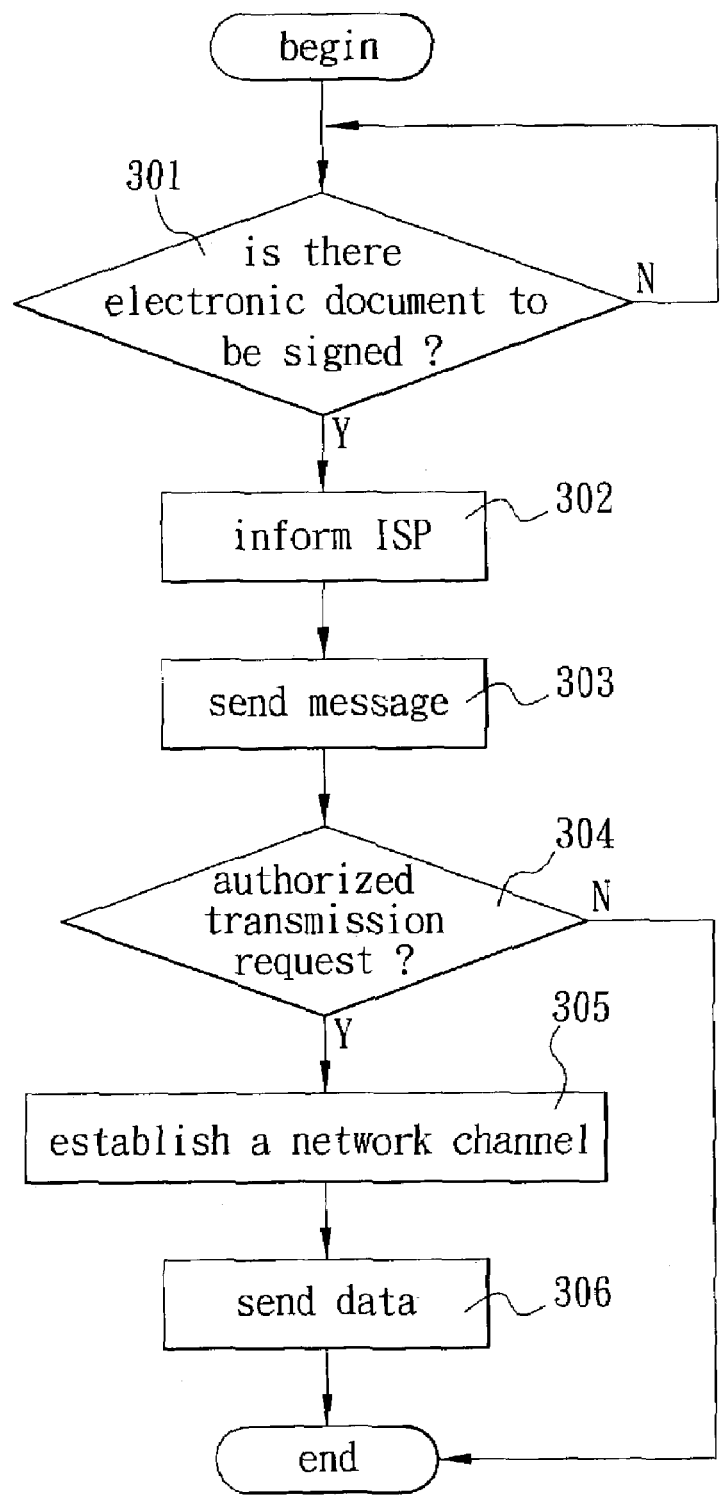
FIG. 3 is a flow chart illustrating a process according to the invention.

Referring to FIG. 3 in conjunction with FIGS. 1 and 2, there is shown a process of carrying out a safe remote electronic signing of electronic document over the Internet 13 by a cellular phone user according to the invention. Steps of the process performed by the server 15 will now be described in detail below. In step 301, it is determined whether there is an electronic document to be signed. If yes, the process goes to step 302. Otherwise, the process loops back to step 301 for continuation.

In step 302, transmit signals of the electronic document to be signed to the ISP 19.

In step 303, once the electronic document is received, the ISP 19 sends a message to the cellular phone 16 based on the set of rules for informing the cellular phone user of the electronic document to be signed. Next, the user runs the electronic signing program 162 on the cellular phone 16 in order to sign the electronic document. The user may then run the Web browsing driver 163 on the cellular phone 16 for selecting a desired safety level. The user then runs the cellular phone dialing program 161 to dial the cellular phone for accessing the Internet 13. The signed and encrypted electronic document is sent back to the server 15.

In step 304, it is determined whether a transmission request is sent out by running the Web browsing driver 163 on the cellular phone 16 and whether the transmission request for obtaining authorization is authorized. If the transmission request is authorized, the process goes to step 305. Otherwise, the process ends immediately.

In step 305, establish a safe network channel based on the authorization.

In step 306, send the electronic document to an assigned address via the network channel prior to ending the process.

By utilizing this, even a third party (e.g., cellular phone user) illegally intercepts the electronic document sent over the Internet, there is no way for the unauthorized third party to browse content of the electronic document. As a result, the purpose of protecting electronic documents is achieved.

Figure 4:
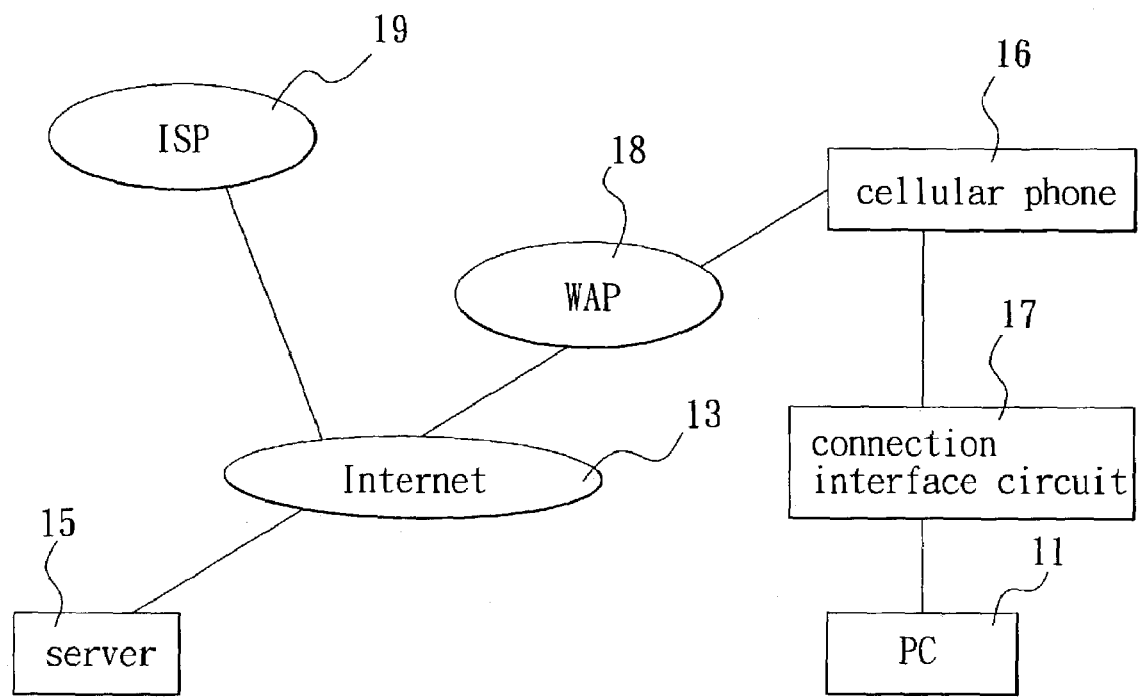
FIG. 4 is a schematic drawing illustrating a structure applicable to a second preferred embodiment of the invention.

Referring to FIG. 4, there is shown a structure applicable to a second preferred embodiment of the invention for a method of carrying out a safe remote electronic signing by cellular phone 16. Similar to the first preferred embodiment a Web browsing driver is installed in the computer 11. The user operates the cellular phone 16 to access the Internet 13 for carrying out a safe remote signing of electronic document. First, the Web browsing driver is used to set conditions for accessing the Internet 13. Microprocessor of the cellular phone 16 may be operated to register and obtain authorization from the server 15 based on the conditions. As such, the user may select a desired safety level by running the driver. In response to the selected safety level, a corresponding password is added in the electronic document. Hence, the electronic document can be sent over the Internet 13 in a form of encryption for transmission on an authorized network channel.

Referring to FIG. 4 again, it is particularly noted that the cellular phone 16 is coupled to the computer 11 through a connection interface circuit 17. The computer 11 is able to install the Web browsing driver in the cellular phone 16.

While the invention has been described by means of specific embodiments, numerous modifications and variations could be made thereto by those skilled in the art without departing from the scope and spirit of the invention set forth in the claims.

What is claimed is:

1. A method of carrying out a safe remote electronic signing by a cellular phone coupled to a computer having a browser for setting conditions for accessing a server via the Internet by performing the steps of:
   registering through the computer for obtaining authorization including an authorized browsing driver from the server via the Internet based on the conditions;
   installing the authorized browsing driver in the cellular phone;
   when the cellular phone is activated to access the Internet for remote signing of an electronic document, selecting a safety level by running the browsing driver; and
   in response to the selected safety level, adding a corresponding password in the electronic document, and sending the electronic document over the Internet in encrypted form for transmission on an authorized network channel.

2. The method of claim 1, further comprising a connection interface circuit for interconnecting the cellular phone with the computer, enabling the computer to install the authorized browsing driver in the cellular phone.

3. The method of claim 1, wherein the cellular phone is coupled to the Internet through a wireless application protocol (WAP) for sending data over the Internet.

4. The method of claim 3, wherein the cellular phone is activated to connect to an Internet service provider (ISP) for establishing a set of rules about messages, the method further comprising the steps of:
   in response to establishment of the set of rules, activating the server to receive the electronic document from the Internet based on the set of rules;
   in response to receiving of the electronic document, transmitting signals associated with the electronic document to the ISP; and
   in response to receiving the signals associated with the electronic document, activating the ISP to send a message to the cellular phone informing the cellular phone user of the electronic document to be signed,
   running the electronic signing program in order to sign the electronic document.

5. A method of carrying out a safe remote electronic signing by a cellular phone having a Web browsing driver of a computer installed therein and being activated to access the Internet for remote signing of an electronic document and setting conditions for accessing the Internet in the Web browsing driver by performing the steps of:

registering through the computer for obtaining authorization from a server connected to the computer via the Internet based on the conditions;

selecting a safety level by running the browsing driver;

in response to the selected safety level, adding a corresponding password in the electronic document; and sending the electronic document over the Internet in in encrypted form for transmission on an authorized network channel.

6. The method of claim 5, further comprising a connection interface circuit for interconnecting the cellular phone with the computer, enabling the computer to install the authorized browsing driver in the cellular phone.

* * * * *